US010627784B2

(12) United States Patent
Kanaya et al.

(10) Patent No.: US 10,627,784 B2
(45) Date of Patent: Apr. 21, 2020

(54) CONTROL SYSTEM AND CONTROL DEVICE

(71) Applicant: OMRON Corporation, Kyoto (JP)

(72) Inventors: Yuki Kanaya, Ritto (JP); Asahi Matsui, Takatsuki (JP); Norihiro Maekawa, Takatsuki (JP); Ryosuke Fujimura, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/161,102

(22) Filed: Oct. 16, 2018

(65) Prior Publication Data

US 2019/0204792 A1    Jul. 4, 2019

(30) Foreign Application Priority Data

Dec. 28, 2017  (JP) ................................ 2017-253327

(51) Int. Cl.
*G05B 9/03* (2006.01)
*G05B 19/042* (2006.01)

(52) U.S. Cl.
CPC ............. *G05B 9/03* (2013.01); *G05B 19/042* (2013.01); *G05B 19/0425* (2013.01)

(58) Field of Classification Search
CPC ..... G05B 19/0425; G05B 19/042; G05B 9/03
See application file for complete search history.

(56) References Cited

U.S. PATENT DOCUMENTS

| 2003/0004686 A1* | 1/2003 | Ueno ................. G05B 19/0423 702/188 |
| 2004/0215354 A1* | 10/2004 | Nakamura ............... G05B 9/02 700/21 |
| 2011/0077906 A1* | 3/2011 | Ueno ................... G05B 19/058 702/179 |
| 2012/0191418 A1* | 7/2012 | Cheng .............. G01R 31/31726 702/189 |

(Continued)

FOREIGN PATENT DOCUMENTS

| EP | 1703348 | 9/2006 |
| EP | 2538290 | 12/2012 |

(Continued)

OTHER PUBLICATIONS

"Search Report of Europe Counterpart Application", dated Sep. 13, 2019, p. 1-p. 10.

*Primary Examiner* — Vincent H Tran
(74) *Attorney, Agent, or Firm* — JCIPRNET

(57) ABSTRACT

A first control unit includes a data transfer relay unit that executes a process of transferring input data corresponding to a signal input to an input and output unit to a second control unit according to a request from the second control unit, and/or a process of transferring output data that defines a signal to be output from the input and output unit from the second control unit to the input and output unit, a storage unit that holds the data transferred by the data transfer relay unit, and a monitoring processing unit that determines whether or not a predetermined trigger condition has been satisfied on the basis of the data held in the storage unit, and (Continued)

outputs a value of any data held in the storage unit according to a predetermined output configuration when it is determined that the trigger condition has been satisfied.

20 Claims, 11 Drawing Sheets

(56) References Cited

U.S. PATENT DOCUMENTS

2014/0074275 A1* 3/2014 Guenther ............ G05B 19/058
                                                                         700/110

FOREIGN PATENT DOCUMENTS

| EP | 3068038 | 9/2016 |
| JP | 2007114862 | 5/2007 |
| JP | 2015176370 | 10/2015 |

* cited by examiner

| Variable | Address |
|---|---|
| ESTOP_1 | FF5298_0 |
| ESTOP_2 | FF5298_1 |
| ESTOP_3 | FF5298_2 |
| ESTOP_4 | FF5298_3 |
| ESTOP_5 | FF5298_4 |
| ESTOP_6 | FF5298_5 |
| ⋮ | ⋮ |

| Variable name | Data type | Comment |
|---|---|---|
| ESTOP_1 | SAFEBOOL | Line1_EmergencyStop1 |
| ESTOP_2 | SAFEBOOL | Line1_EmergencyStop2 |
| SLC_1 | SAFEBOOL | Line1_LightCurtain1 |
| SLC_2 | SAFEBOOL | Line1_LightCurtain1 |
| Door_1R | SAFEBOOL | Line2_DoorRight |
| Door_1L | | |
| RunSignal | BOOL | RunSignal from PLC |
| ErrorSignal | BOOL | ErrorSignal from PLC |
| ResetSwitch | BOOL | ResetSwitch |

Logging configuration generation screen

Generation

Data logging No. 1

☑ Validate data logging process at time of start of process

Data logging ID  Log170522   Import   Export

Trigger condition  SR1   False(Foting)
Sampling period  5  ms
Pre-trigger ratio  10.000  s     5.000  s Target data (8/100)

CONTROL SYSTEM AND CONTROL DEVICE

CROSS-REFERENCE TO RELATED APPLICATION

This application claims the priority of Japan patent application serial no. 2017-253327, filed on Dec. 28, 2017. The entirety of the above-mentioned patent application is hereby incorporated by reference herein and made a part of this specification.

BACKGROUND

Technical Field

The disclosure relates to a control system including a plurality of control units each which executes a program, and a control device intended for the control system.

Description of Related Art

When an event such as any abnormality occurs in a control target that is controlled by a control device, there is a need to analyze a cause of the event occurrence or an event occurrence situation. In response to such a need, for example, Japanese Patent Application Laid-Open No. 2015-176370 (Patent Document 1) discloses a technology for enabling a status of a control device at the time of generation of a cause of the event to be easily recognized when an event occurs.

Incidentally, safety components according to international standards must be used in order to safely use facilities or machines that are used in many manufacturing sites. Safety components are intended to prevent human safety from being threatened by automatically moving devices such as robots. Examples of the safety components include a safety control device that executes a safety program, a detection device that detects the presence or entrance of a person, an input device that receives an operation at the time of an emergency, and an output device that actually stops a facility or machine.

[Patent Document 1] Japanese Patent Application Laid-Open No. 2015-176370.

Even when a safety program is being executed, there is a need to record a status of a safety control device at the time of generation of the cause of the event when an event has occurred.

Meanwhile, a safety control device is required to reliably execute a safety program according to international standards, and a process of recording a status of the safety control device must not have an influence on the execution of the safety program under any circumstances. Such restrictions cause a problem in that a status recording process (that is, a data logging process) in the safety control device cannot be easily implemented. Further, for example, in an environment in which each of a plurality of control units executes a control program, a situation in which there are not sufficient resources remaining to implement the status recording process (the data logging process) in each control unit is also conceivable.

SUMMARY

An aspect of the disclosure is to provide a control system and the like for solving the problems as described above.

A control system according to an embodiment of the disclosure includes a first control unit that executes a first control program; a second control unit that executes a second control program; and an input and output unit that serves to input a signal from a field and/or output a signal to a field. The first control unit includes: a data transfer relay unit that executes a process of transferring input data corresponding to a signal input to the input and output unit to the second control unit according to a request from the second control unit, and/or a process of transferring output data that defines a signal to be output from the input and output unit from the second control unit to the input and output unit, a storage unit that stores the data transferred by the data transfer relay unit, and a monitoring processing unit that determines whether or not a predetermined trigger condition has been satisfied on the basis of the data held in the storage unit, and outputs values of any data held in the storage unit according to a predetermined output configuration when it is determined that the trigger condition has been satisfied.

In this disclosure, the first control unit may further include an interface that receives a detachable recording medium. The monitoring processing unit may write the value of the data to the detachable recording medium.

In the above disclosure, the monitoring processing unit may read the trigger condition and the output configuration from the detachable recording medium.

In the above disclosure, the monitoring processing unit may validate a determination as to whether or not the trigger condition has been satisfied in response to a user operation.

In the above disclosure, the second control unit may transmit a command for validating the determination as to whether or not the trigger condition has been satisfied to the first control unit in response to a user operation with respect to the second control unit.

In the above disclosure, the monitoring processing unit may output time-series values over a predetermined period including a timing at which it is determined that the trigger condition has been satisfied.

In the above disclosure, the control system may further include a configuration reception unit that provides a user interface screen for generating the trigger condition and the output configuration.

In the above disclosure, the configuration reception unit may output a message when data not held in the storage unit of the first control unit is designated as the trigger condition or the output configuration.

In the above disclosure, the trigger condition and the output configuration may be defined using variables available in the second control unit. The first control unit may have memory mapping information indicating a correspondence relationship between the variables used for definition of the trigger condition and the output configuration and the data held in the storage unit. The memory mapping information may be generated at the same time as when the second control program is generated.

In the above disclosure, the first control unit is a standard control unit that controls a control target according to a standard control program. The second control unit is a safety control unit that executes a safety program. The input and output unit includes a safety input and output unit that serves to input a signal from a safety component and/or output a signal to a safety component.

According to an embodiment, a control device that controls a control target according to a first control program is provided. The control device is communicatively connected to a second control unit executing a second control program and communicatively connected to an input and output unit that serves to input a signal from a field and/or output a signal to a field. The control device includes: a data transfer relay unit that executes a process of transferring input data corresponding to a signal input to the input and output unit to the second control unit according to a request from the second control unit, and/or a process of transferring output data that defines a signal to be output from the input and output unit from the second control unit to the input and output unit, a storage unit that holds the data transferred by the data transfer relay unit, and a monitoring processing unit that determines whether or not a predetermined trigger condition has been satisfied on the basis of the data held in the storage unit, and outputs a value of any data held in the storage unit according to a predetermined output configuration when it is determined that the trigger condition has been satisfied.

BRIEF DESCRIPTION OF THE DRAWINGS

FIG. 8 is a schematic diagram illustrating an example of memory mapping information used for the data logging process that is executed in the control system according to the embodiment.

FIG. 9 is a schematic diagram illustrating an example of a user interface screen for generating a logging configuration for the data logging process that is executed in the control system according to the embodiment.

DESCRIPTION OF THE EMBODIMENTS

Figure 1:
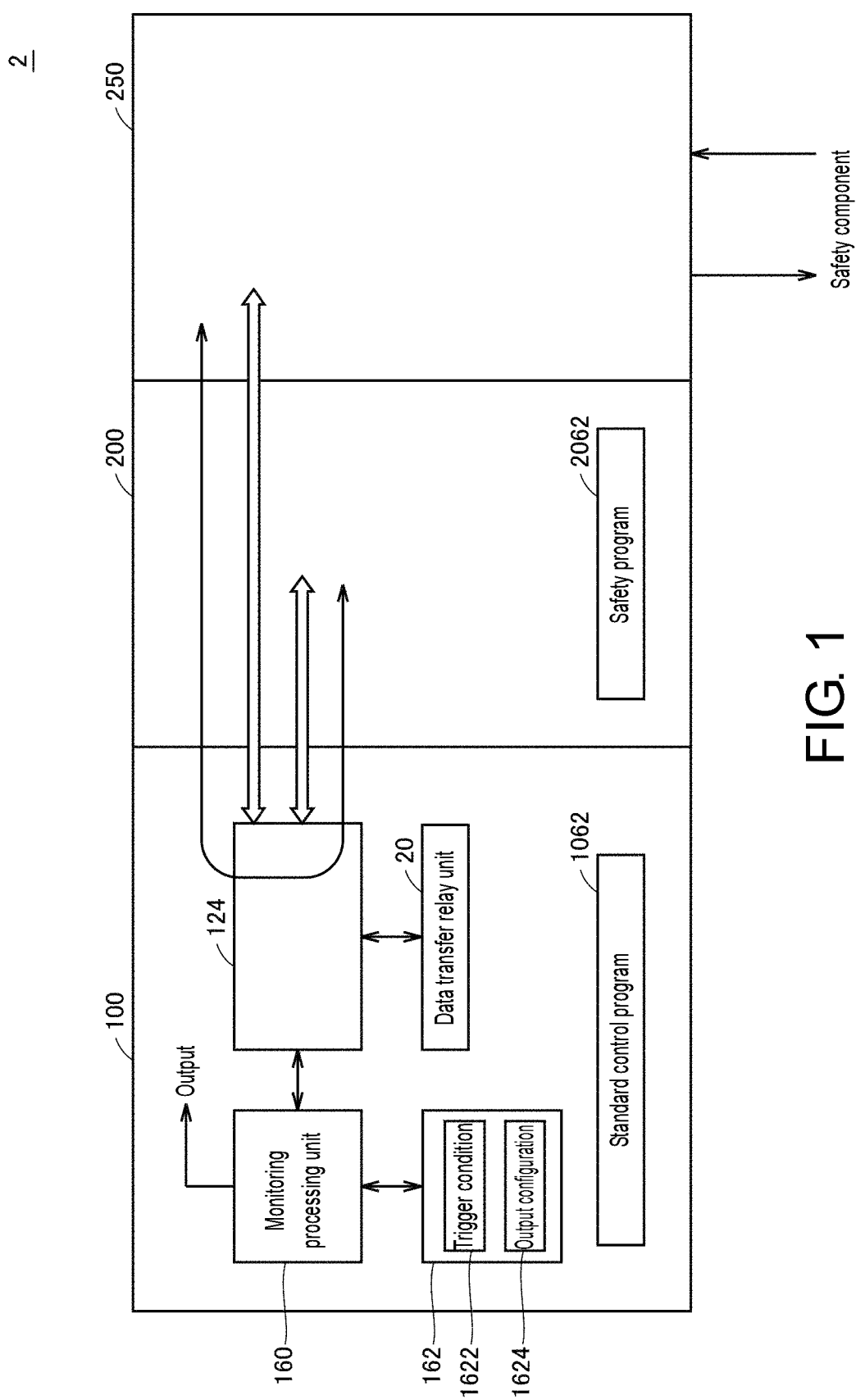
FIG. 1 is a schematic diagram illustrating an overall example of a configuration of a control system according to an embodiment.

Embodiments of the disclosure will be described in detail with reference to the drawings. In the drawings, the same or corresponding parts are denoted by the same reference numerals, and description thereof will not be repeated.

A. Example of Application

First, an example of a scene in which the disclosure is applied will be described. The control system according to the embodiment includes a first control unit that executes a first control program, a second control unit that executes a second control program, and an input and output unit.

As one example, a standard control unit that controls a control target according to a standard control program may be adopted as the first control unit, and a safety control unit that executes a safety program may be adopted as the second control unit. In this case, a safety input and output unit that serves to input a signal from the safety component and/or output a signal to the safety component may be adopted as the input and output unit.

Alternatively, the standard control unit may be adopted as any of the first control unit and the second control unit. Typically, the first control unit may execute the first control program, and the second control unit may execute the second control program to control the control target. In this case, it is assumed that the first control unit has more calculation resources than the second control unit. Furthermore, a safety control unit may be adopted as any of the first control unit and the second control unit.

That is, when the status recording process (the data logging process) is implemented, an environment in which the first control unit has less constraints than the second control unit is assumed.

In the following description, as a typical example, a standard control unit is assumed as the first control unit, and a safety control unit is assumed as the second control unit.

FIG. 1 is a schematic diagram illustrating an example of an overall configuration of a control system 2 according to the embodiment. Referring to FIG. 1, the control system 2 includes a standard control unit 100 that is an example of a control device, a safety control unit 200, and one or a plurality of safety input and output units (hereinafter also referred to as "safety IO units") 250.

The standard control unit 100 controls a control target according to a standard control program 1062. The control target includes any facility or device.

The safety control unit 200 is communicatively connected to the standard control unit 100. Typically, the standard control unit 100 and the safety control unit 200 are connected via an internal bus. The safety control unit 200 executes a safety program 2062.

In this specification, "standard control" that is executed according to the standard control program 1062 typically collectively refers to a process of sequentially generating commands for controlling the control target, according to a predetermined required specification. Further, in this specification, the "safety control" that is executed according to the safety program 2062 is a term collectively referring to a process of generating a command for preventing a security of a person from being threatened by the control target due to any problem. The safety control includes a process of stopping the control target, for example, not only when a behavior of the control target itself is different from an inherent behavior, but also when it is determined that, for example, the control system 2 cannot appropriately execute control.

A safety IO unit 250 serves to input signals from the safety component and/or output a signal to the safety component. The safety component includes a safety relay or various safety sensors. Although the example in which the safety IO unit 250 is disposed on a common transfer path to the safety control unit 200, the disclosure is not limited thereto and the safety IO unit 250 may be connected to the standard control unit 100 via another transfer path.

The standard control unit 100 includes a data transfer relay unit 20 associated with the transfer path of the safety control unit 200 and the safety IO unit 250. According to a request from the safety control unit 200, the data transfer relay unit 20 executes a process of transmitting, to the safety control unit 200, input data corresponding to a signal input to the safety IO unit 250 and/or a process of transferring output data defining a signal to be output from the safety IO unit 250 from the safety control unit 200 to the safety IO unit 250.

The standard control unit 100 includes an IO data memory 124 which is an example of a storage unit which holds data that is transmitted by the data transfer relay unit 20. The standard control unit 100 includes a monitoring processing unit 160 associated with the IO data memory 124. The monitoring processing unit 160 determines whether or not a predetermined trigger condition 1622 has been satisfied on the basis of the data held in the IO data memory 124. When it is determined that the trigger condition 1622 has been satisfied, the monitoring processing unit 160 outputs a value of any data held in the IO data memory 124 according to a predetermined output configuration 1624. That is, the monitoring processing unit 160 executes a data logging process.

It should be noted that the trigger condition 1622 and the output configuration 1624 may be combined as the logging configuration 162.

By adopting the configuration as illustrated in FIG. 1, it is possible to realize a data logging process not having an influence on the execution of the safety program 2062 in the safety control unit 200. Accordingly, irrespective of any problems occurring in the safety control, it is possible to support clarification or estimation of a cause thereof or the like.

B. Configuration Example of Overall System 1

Figure 2:
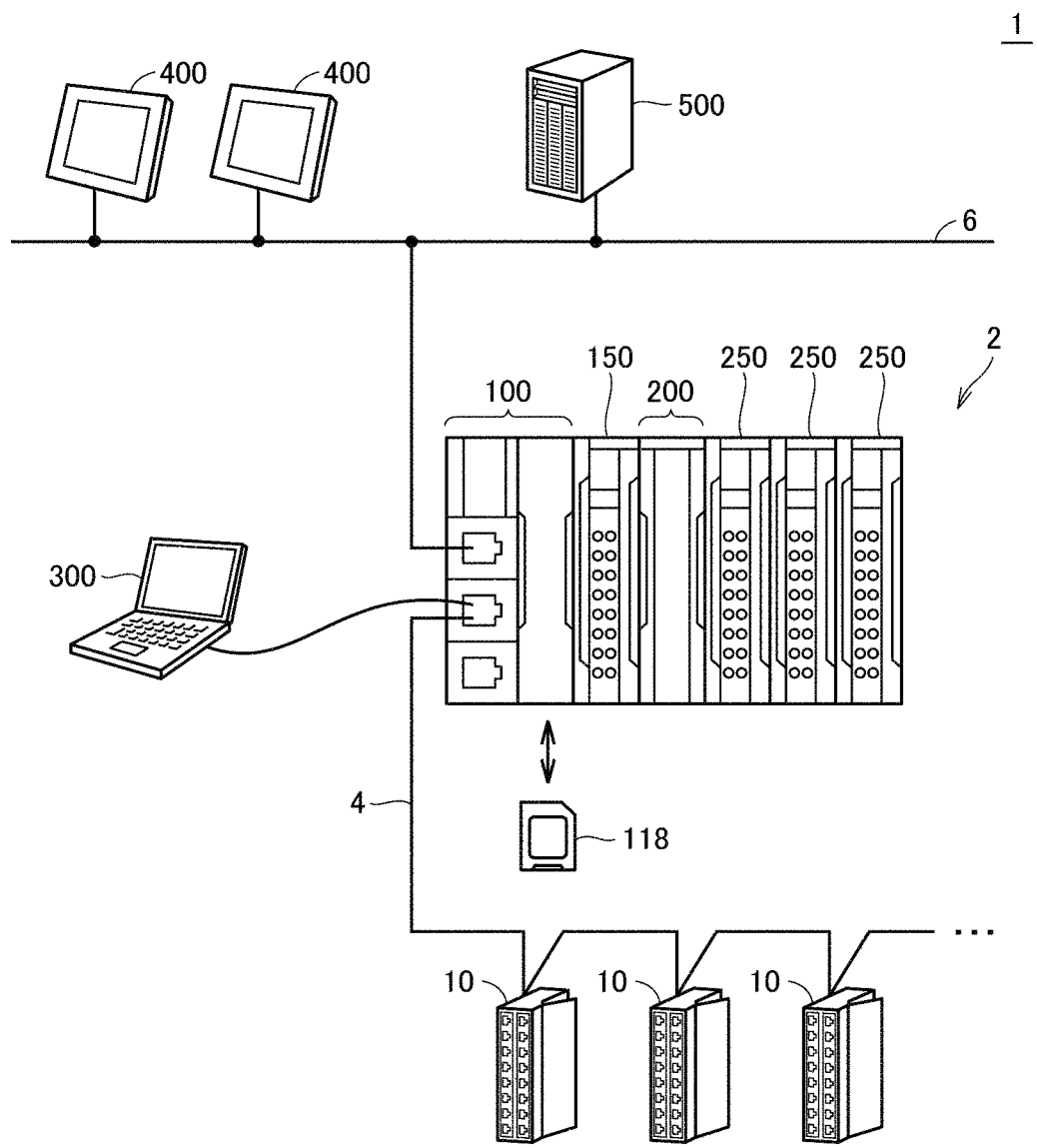
FIG. 2 is a schematic diagram illustrating an example of a configuration of an overall system including the control system according to the embodiment.

Next, an example of a configuration of an overall system 1 including the control system 2 according to the embodiment will be described. FIG. 2 is a schematic diagram illustrating an example of a configuration of the overall system 1 including the control system 2 according to the embodiment. Referring to FIG. 2, the overall system 1 includes the control system 2, one or a plurality of field devices connected to the control system 2 via a field network 4, operation and display devices 400 connected to the control system 2 via a high-level network 6, and a server device 500.

In this specification, the "field device" is a term collectively referring to devices capable of network connection via the field network 4. The field device may be various devices such as an IO device, a robot controller, a temperature controller, and a flow rate controller, in addition to the safety IO unit 10 illustrated in FIG. 1.

The control system 2 is configured to be able to execute each of the standard control and the safety control. More specifically, the control system 2 includes the standard control unit 100 that serves standard control, a power supply unit 150, a safety control unit 200 that serves safety control, and one or a plurality of safety IO units 250. These units are connected to be able to perform data communication via an internal bus 12 (see FIG. 3). Although only the safety IO unit 250 is illustrated as an IO unit in FIG. 2, the disclosure is not limited thereto, and a normal IO unit or a communication unit to be used for the standard control may be mounted.

The standard control unit 100 executes a standard control program arbitrarily created according to a control target to realize control for the control target. By using the standard IO unit, the standard control unit 100 exchanges signals with field devices such as various sensors or switches. The safety control unit 200 executes a safety program created according to a predetermined safety reference to realize the safety control.

The safety control unit 200 exchanges signals with the field devices such as the safety components using the one or plurality of safety IO units 250 connected thereto via the internal bus 12 and/or the safety IO unit 10 connected thereto via the field network 4.

Typically, it is preferable for a protocol in which a data arrival time between network nodes is guaranteed to be adopted for the field network 4. For example, EtherCAT (registered trademark) or the like can be adopted as such a protocol in which the data arrival time between network nodes is guaranteed. Alternatively, EtherNet/IP (registered trademark), DeviceNet (registered trademark), CompoNet (registered trademark), or the like may be adopted. Hereinafter, a case in which EtherCAT is adopted as the field network 4 will be described by way of example.

In this specification, the "field network" collectively refers to a communication medium for realizing data transfer for an industrial device, and includes a concept including a "field bus".

A support device 300 can be connected to the standard control unit 100 and/or the safety control unit 200 of the control system 2.

The standard control unit 100 of the control system 2 is connected to one or a plurality of safety IO units 10 via the field network 4. The standard control unit 100 functions as a communication master in the field network 4, and each of the safety IO units 10 functions as a slave. The standard control unit 100 acquires data (hereinafter also referred to as "input data") collected by the safety IO unit 10 via the field network 4, and transmits a command for the safety IO unit 10 (hereinafter also referred to as "output data").

The operation and display device 400 functions as a human machine interface (HMI) device, displays a status value or the like held by the control system 2, receives a user operation, and outputs the user operation to the control system 2.

The server device 500 includes, for example, a database that collects information from the control system 2 or an operation management system that gives various configurations such as a recipe to the control system 2.

C. Example of Hardware Configuration

Next, an example of a hardware configuration of a main device constituting the overall system 1 according to the embodiment will be described.

(c1: Standard Control Unit 100)

Figure 3:
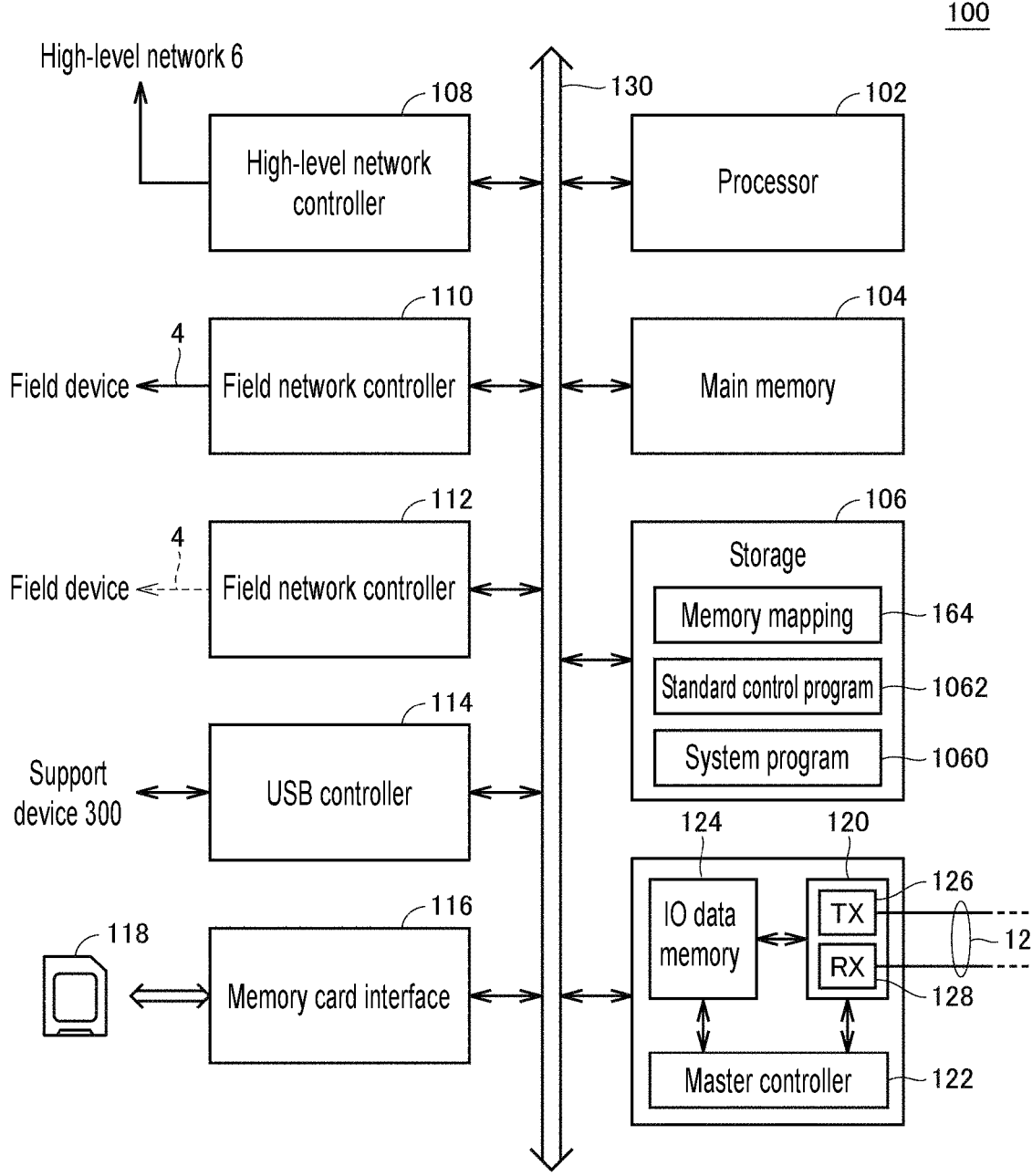
FIG. 3 is a schematic diagram illustrating an example of a hardware configuration of a standard control unit constituting the control system according to the embodiment.

FIG. 3 is a schematic diagram illustrating an example of a hardware configuration of the standard control unit 100 constituting the control system 2 according to the embodiment. Referring to FIG. 3, the standard control unit 100 includes a processor 102, a main memory 104, a storage 106, a high-level network controller 108, field network controllers 110 and 112, a universal serial bus (USB) controller 114, a memory card interface 116, and an internal bus controller 120. These components are connected via a processor bus 130.

The processor 102 corresponds to a calculation processing unit that executes a control calculation or the like, and includes a central processing unit (CPU) or a graphics processing unit (GPU). Specifically, the processor 102 reads a program (for example, the system program 1060 and the standard control program 1062) stored in the storage 106, develops the program in the main memory 104, and executes the program to realize control according to a control target, and various processes as will be described below.

The main memory 104 includes, for example, a volatile storage device such as a dynamic random access memory (DRAM) or a static random access memory (SRAM). The storage 106 includes, for example, a nonvolatile storage device such as a hard disk drive (HDD) or a solid state drive (SSD).

In the storage 106, the standard control program 1062 created according to a control target such as a facility or a machine is stored in addition to the system program 1060 for realizing basic functions. In the storage 106, a memory mapping information 164 may be further stored. Details of the memory mapping information 164 will be described below.

The high-level network controller 108 exchanges data with any information processing device such as the operation and display device 400 or the server device 500 (see FIG. 2) via the high-level network 6.

The field network controllers 110 and 112 exchanges data with the field device via the field network 4. The field network controllers 110 and 112 function as communication masters for performing periodic communication via the field network 4. Although the field network controllers 110 and 112 are illustrated in FIG. 3, a single field network controller may be provided.

The USB controller 114 exchanges data with the support device 300 or the like via a USB connection.

The memory card interface 116 receives a memory card 118 which is an example of a detachable recording medium. The memory card interface 116 can write data to the memory card 118 and can read various types of data (logs, trace data, or the like) from the memory card 118.

The internal bus controller 120 exchanges data with one or a plurality of functional units (including the safety IO unit 250) via the internal bus 12. The internal bus controller 120 corresponds to a communication interface for electrically connecting the standard control unit 100 to the functional unit.

In this specification, the "functional unit" is a term collectively referring to a device connected to the standard control unit 100 or the like to exchange various signals with a control target. The functional unit may include an IO unit, a communication unit, and a controller unit having special functions such as PID control or motion control. The IO unit has, for example, one or a plurality of functions among a digital input (DI) function for receiving a digital input signal from the control target, a digital output (DO) function for transmitting a digital output signal to the control target, an analog input (AI) function for receiving an analog input signal from the control target, and an analog output (AO) function for transmitting an analog output signal to the control target.

The internal bus controller 120 functions as a communication master for performing periodic communication via the internal bus 12. More specifically, the internal bus controller 120 includes a master controller 122, an IO data memory 124, a transmission circuit (TX) 126, and a reception circuit (RX) 128.

The IO data memory 124 is a memory for temporarily holding data (input data and output data) that is exchanged with the functional unit via the internal bus 12, and an address is predefined in association with each functional unit. The transmission circuit 126 generates a communication frame including output data and transmits the communication frame on the internal bus 12. The reception circuit 128 receives a communication frame transferred on the internal bus 12 and demodulates the communication frame into input data. The internal bus controller 120 provides a function as the data transfer relay unit 20 (FIG. 1).

The master controller 122 controls the IO data memory 124, the transmission circuit 126, and the reception circuit 128 according to, for example, a data transfer timing on the internal bus 12. The master controller 122 provides control as a communication master that manages, for example, data transfer on the internal bus 12.

Although the example of the configuration in which the necessary functions are provided by the processor 102 executing the program is illustrated in FIG. 3, some or all of the provided functions may be implemented by a dedicated hardware circuit (for example, an application specific integrated circuit (ASIC), a field-programmable gate array (FPGA), or the like). Alternatively, main units of the standard control unit 100 may be realized by using hardware according to a general-purpose architecture (for example, an industrial personal computer based on a general-purpose personal computer). In this case, a plurality of operating systems (OSs) having different uses may be executed in parallel using a virtualization technology and necessary applications may be executed on each OS. Further, a configuration in which the functions of the display device, the support device, and the like are integrated in the standard control unit 100 may be adopted.

(c2: Power Supply Unit 150)

The power supply unit 150 supplies power to the standard control unit 100, the safety control unit 200, and the safety IO units 250 constituting the control system 2, and also supplies power to various devices (a sensor, a relay, and the like) connected to the safety IO unit 250. Since the hardware configuration of the power supply unit 150 is well known, more detailed description thereof will be omitted.

(c3: Safety Control Unit 200)

Figure 4:
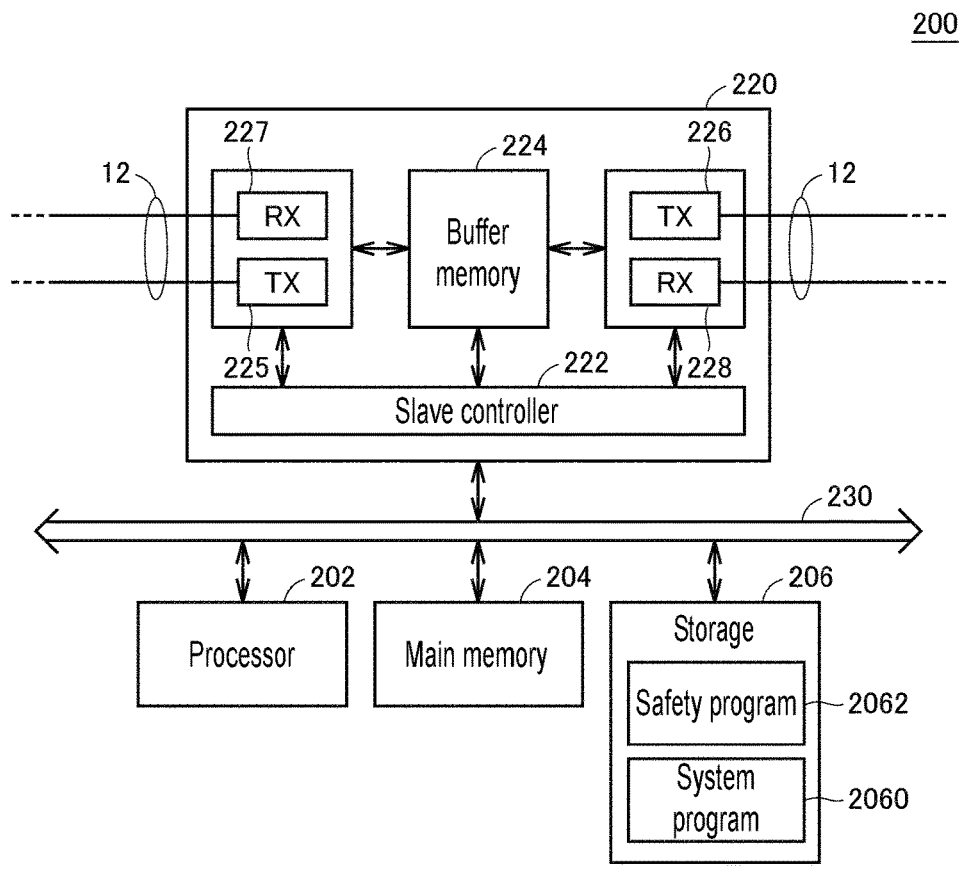
FIG. 4 is a schematic diagram illustrating an example of a hardware configuration of a safety control unit constituting the control system according to the embodiment.

FIG. 4 is a schematic diagram illustrating an example of a hardware configuration of the safety control unit 200 constituting the control system 2 according to the embodiment. Referring to FIG. 4, the safety control unit 200 includes a processor 202, a main memory 204, a storage 206, and an internal bus controller 220. These components are connected via a processor bus 230.

The internal bus controller 220 functions as a communication slave and provides a communication interface that is the same as the functional unit. That is, the internal bus controller 220 exchanges data with the standard control unit 100 and the functional unit via the internal bus 12.

The functional unit and the safety control unit 200 are connected in a daisy chain on the internal bus 12. That is, when the internal bus controller 220 receives a communication frame from a device present on the upstream side on the internal bus 12, the internal bus controller 220 internally copies all or a part of data of the communication frame and transfers all or a part of the data to a device present on the downstream side. Similarly, when the internal bus controller 220 receives a communication frame from a device present on the downstream side on the internal bus 12, the internal bus controller 220 internally copies all or a part of the data of the communication frame, and transfers all or a part of the data to a device present on the upstream side. Through such sequential transfer of the communication frames, data transfer is realized between the standard control unit 100 and the functional unit/the safety control unit 200.

More specifically, the internal bus controller 220 includes a slave controller 222, a buffer memory 224, transmission circuits (TX) 225 and 226, and reception circuits (RX) 227 and 228.

The buffer memory 224 temporarily holds communication frames transferred on the internal bus 12. When the reception circuit 227 receives the communication frame transferred on the internal bus 12, the reception circuit 227 stores all or a part of the communication frame in the buffer memory 224. The transmission circuit 226 transmits the communication frame received by the reception circuit 227 to the internal bus 12 on the downstream side.

Similarly, when the reception circuit 228 receives the communication frame transferred on the internal bus 12, the reception circuit 228 stores all or a part of the communication frame in the buffer memory 224. The transmission circuit 225 transmits the communication frame received by the reception circuit 128 to the internal bus 12 on the downstream side.

The slave controller 222 controls the transmission circuits 225 and 226, the reception circuits 227 and 228, and the buffer memory 224 in order to realize the sequential transfer of communication frames on the internal bus 12.

The processor 202 corresponds to a calculation processing unit that executes a control calculation and the like, and includes a CPU, a GPU, or the like. Specifically, the processor 202 reads a program (for example, a system program 2060 and the safety program 2062) stored in the storage 206, develops the program in the main memory 204, and executes the program to realize control according to a control target, and various processes as will be described below.

The main memory 204 includes, for example, a volatile storage device such as a DRAM or an SRAM. The storage 206 includes, for example, a nonvolatile storage device such as an HDD or an SSD.

In the storage 206, the safety program 2062 created according to a safety component that is a target is stored in addition to the system program 2060 for realizing basic functions.

Although the example of the configuration in which necessary functions are provided by the processor 202 executing the program is illustrated in FIG. 4, some or all of these functions to be provided may be implemented by a dedicated hardware circuit (for example, an ASIC or an FPGA). Alternatively, main units of the safety control unit 200 may be realized by using hardware according to a general-purpose architecture (for example, an industrial personal computer based on a general-purpose personal computer).

(c4: Safety IO Unit 250)

The safety IO unit 250 is an example of a functional unit connected to the standard control unit 100 via the internal bus 12 and performs signal input from the safety component and/or signal output to the safety component. The safety IO unit 250 has an input, output, and management function for signals necessary for realization of safety, such as a feedback signal, as compared with the standard IO unit. Since a hardware configuration of the safety IO unit 250 is well known, more detailed description thereof will be omitted.

(c5: Support Device 300)

Figure 5:
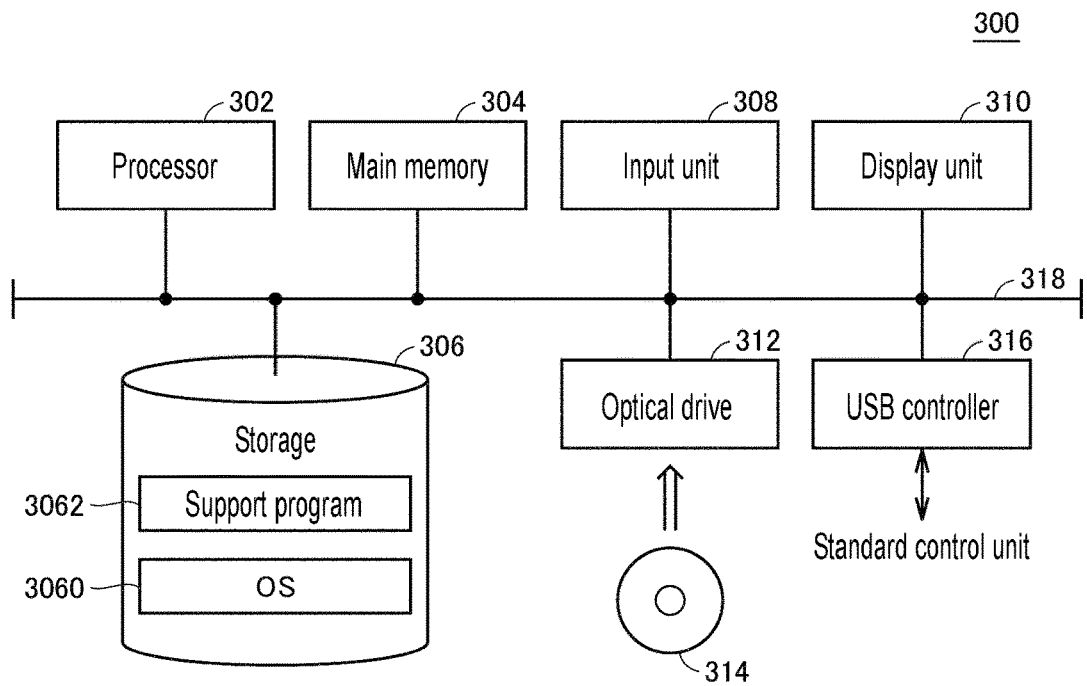
FIG. 5 is a schematic diagram illustrating an example of a hardware configuration of a support device connected to a control system according to the embodiment.

FIG. 5 is a schematic diagram illustrating an example of a hardware configuration of the support device 300 connected to the control system 2 according to the embodiment. The support device 300 is realized by, for example, executing a program using hardware (for example, a general-purpose personal computer) according to a general-purpose architecture.

Referring to FIG. 5, the support device 300 includes a processor 302, a main memory 304, a storage 306, an input unit 308, a display unit 310, an optical drive 312, and a USB controller 316. These components are connected via a processor bus 318.

The processor 302 includes a CPU and the like, reads a program (for example, an OS 3060 and a support program 3062) stored in the storage 306, develops the program in the main memory 304, and executes the program to realize various processing as will be described below.

The main memory 304 includes a volatile storage device, such as a DRAM or an SRAM. The storage 306 includes, for example, a nonvolatile storage device such as an HDD or an SSD.

The support program 3062 for providing a function as the support device 300 is stored in the storage 306, in addition to the OS 3060 for realizing basic functions.

The input unit 308 includes a keyboard, a mouse, or the like, and receives a user operation. The display unit 310 includes a display, various indicators, a printer, or the like, and outputs processing results or the like from the processor 302.

The USB controller 316 controls exchanges of data with, for example, the standard control unit 100 of the control system 2 via a USB connection.

The support device 300 includes the optical drive 312, and a program is read from a recording medium 314 (for example, an optical recording medium such as a digital versatile disc (DVD)) that non-transitorily stores a computer-readable program, and installed in the storage 306 or the like.

Although the program to be executed by the support device 300 may be installed via the computer-readable recording medium 314, the program may be downloaded and installed from, for example, a server device on a network. In addition, functions that are provided by the support device 300 according to the embodiment may be realized by using some of modules that are provided by the OS.

Although the example of the configuration in which the necessary functions of the support device 300 are provided by the processor 302 executing the program is illustrated in FIG. 5, some or all of these functions to be provided may be implemented by using a dedicated hardware circuit (for example, an ASIC or an FPGA).

(c6: Operation and Display Device 400)

As the operation and display device 400 constituting the overall system 1 according to the embodiment, a hardware configuration implemented as a dedicated device may be adopted or a hardware configuration according to a general-purpose architecture (for example, an industrial personal computer based on a general-purpose personal computer) may be adopted.

When the operation and display device 400 is realized by an industrial personal computer based on a general-purpose personal computer, the same hardware configuration as that of the support device 300 as illustrated in FIG. 5 described above is adopted. However, an application program for realizing HMI processing is installed in place of the support program 3062 in the example of the configurations illustrated in FIG. 5.

(c7: Server Device 500)

The server device 500 constituting the overall system 1 according to the embodiment can be realized by, for example, using a general-purpose file server or database server. Since a hardware configuration of such a device is well known, more detailed description will be omitted.

D. Data Transmission of Input and Output Data

Figure 6:
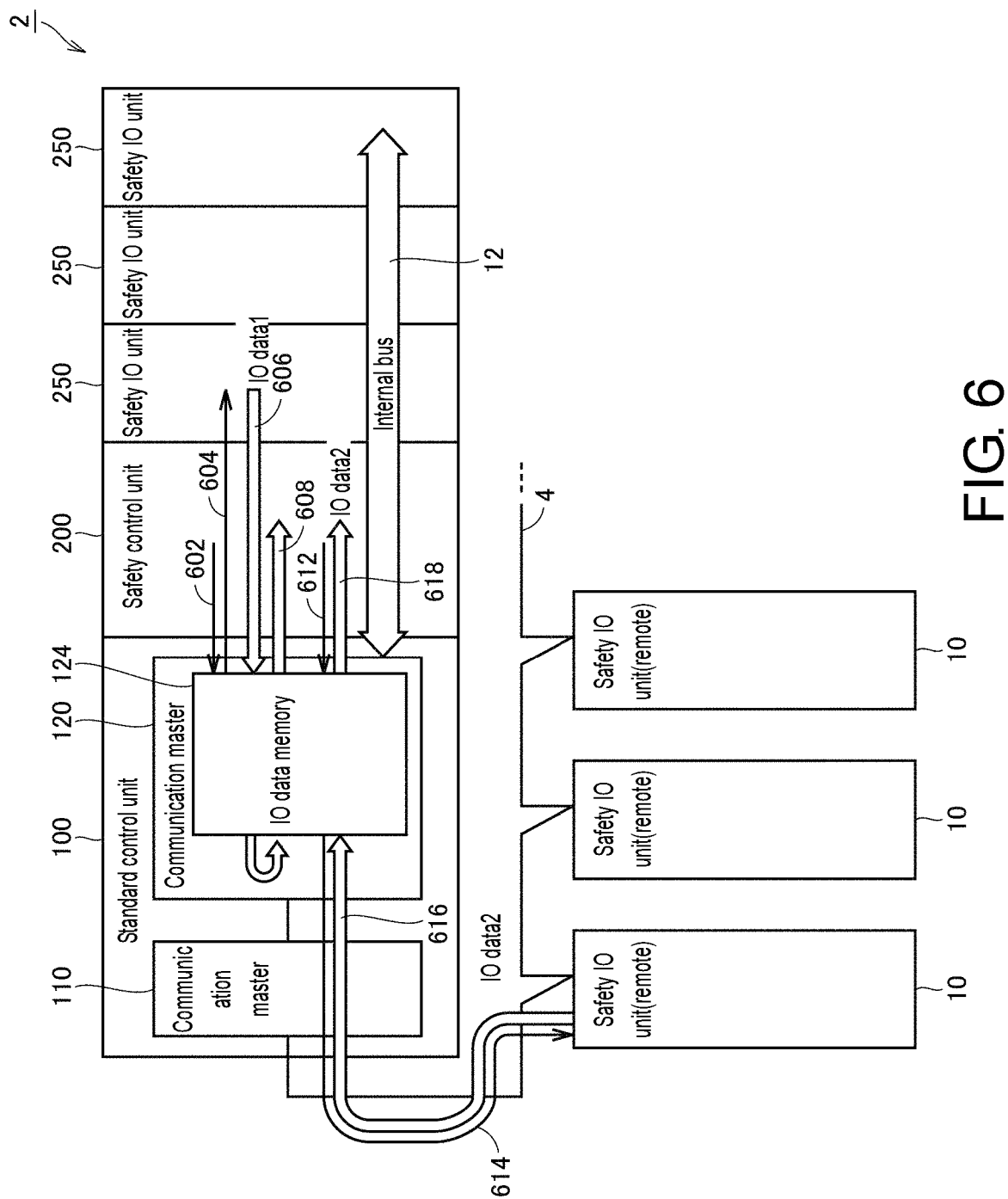
FIG. 6 is a schematic diagram illustrating data transfer of input and output data in the safety control unit of the control system according to the embodiment.

Next, data transfer of input and output data in the safety control unit 200 of the control system 2 according to the embodiment will be described. FIG. 6 is a schematic diagram illustrating data transfer of input and output data in the safety control unit 200 of the control system 2 according to the embodiment.

Referring to FIG. 6, the safety control unit 200 exchanges input data and output data with the one or plurality of safety IO units 250 connected via the internal bus 12. The safety control unit 200 is not a communication master with respect to the data transfer on the internal bus 12, and cannot control a data transmission and reception timing by itself. Therefore, the input data and the output data are exchanged between the safety control unit 200 and the one or plurality of safety IO units 250 via the standard control unit 100 which is a communication master of the internal bus 12.

For example, when the safety control unit 200 collects input data held by a specific safety IO unit 250, the safety control unit 200 transmits an input data request 602 to the standard control unit 100 (the internal bus controller 120). Then, the internal bus controller 120 of the standard control unit 100 transmits an input data transmission request 604 to the safety IO unit 250 that is a target. The safety IO unit 250 receiving the input data transmission request 604 transmits designated input data 606 to the internal bus controller 120 of the standard control unit 100.

The internal bus controller 120 of the standard control unit 100 temporarily stores the input data 606 from the safety IO unit 250 in the IO data memory 124 and transmits some or all of the pieces of the stored data to the safety control unit 200 as the input data 608. Through such a series of transmission and reception processes, the input data held by the safety IO unit 250 is transferred to the safety control unit 200.

Conversely, when output data is transmitted from the safety control unit 200 to the specific safety IO unit 250, the output data is transferred through a path reverse to a path described above. That is, the safety control unit 200 transmits the output data directed to the specific safety IO unit 250 to the internal bus controller 120 of the standard control unit 100. The internal bus controller 120 of the standard control unit 100 temporarily stores the output data from the safety control unit 200 in the IO data memory 124 and transmits some or all of the pieces of stored data to the safety IO unit 250 that is a target as the output data. Accordingly, the output data is transferred from the safety control unit 200 to the specific safety IO unit 250.

Further, the safety control unit 200 exchanges the input data and the output data with the one or plurality of safety IO units 10 remotely connected thereto via the field network 4. In this case, the input data and the output data are exchanged between the safety control unit 200 and the one or plurality of safety IO units 10 via the standard control unit 100 which is a communication master of the field network 4.

For example, when the safety control unit 200 collects input data held by the specific safety IO unit 10, the safety control unit 200 transmits an input data request 612 to the standard control unit 100 (the internal bus controller 120).

When the field network controller 110 of the standard control unit 100 receives the input data request 612, the field network controller 110 of the standard control unit 100 transmits an input data transmission request 614 to the safety IO unit 10 that is a target. The safety IO unit 10 receiving the input data transmission request 614 transmits designated input data 616 to the field network controller 110 of the standard control unit 100.

When the field network controller 110 of the standard control unit 100 receives the input data 616 from the safety IO unit 10, the field network controller 110 of the standard control unit 100 internally transfers the input data 616 to the internal bus controller 120. The internal bus controller 120 temporarily stores the transferred input data 616 in the IO data memory 124 and transmits some or all of the pieces of stored data to the safety control unit 200 as input data 618. Through such a series of transmission and reception processes, the input data held by the safety IO unit 10 is transmitted to the safety control unit 200.

Conversely, when output data is transmitted from the safety control unit 200 to the specific safety IO unit 10 and collected, the output data is transferred via a path reverse to a path described above. That is, the safety control unit 200 transmits output data directed to the specific safety IO unit 10 to the internal bus controller 120 of the standard control unit 100. The internal bus controller 120 of the standard control unit 100 temporarily stores the output data from the safety control unit 200 in the IO data memory 124 and internally transfers some or all of the pieces of stored data to the field network controller 110 as output data. The field network controller 110 transmits the transferred output data to the safety IO unit 10 that is a target. Accordingly, the output data is transferred from the safety control unit 200 to the specific safety IO unit 10.

E. Data Logging Processing

Next, a data logging process that is executed in the control system 2 according to the embodiment will be described.

Figure 7:
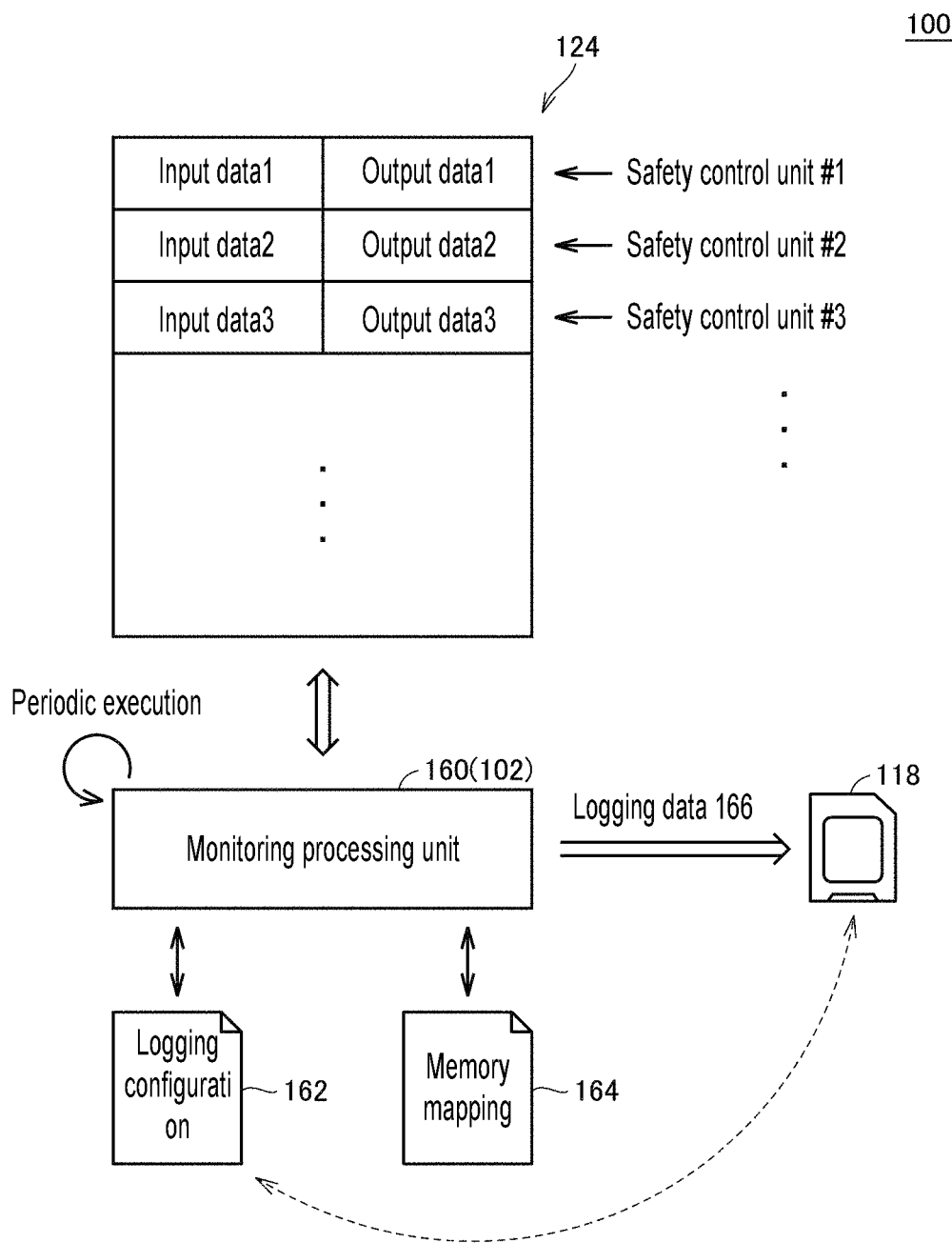
FIG. 7 is a schematic diagram illustrating a data logging process that is executed in the control system according to the embodiment.

FIG. 7 is a schematic diagram illustrating a data logging process that is executed in the control system 2 according to the embodiment. Referring to FIG. 7, the standard control unit 100 includes a monitoring processing unit 160 for realizing the data logging process. Typically, the monitoring processing unit 160 is realized by the processor 102 executing the system program 1060. The monitoring processing unit 160 may be registered as a part of a task that is executed in the standard control unit 100.

The monitoring processing unit 160 monitors the value of the IO data memory 124 at predetermined periods. As described with reference to FIG. 6, the input data and/or the output data exchanged between the safety control unit 200 and the safety IO unit 250 or the safety IO unit 10 is stored in the IO data memory 124. The monitoring processing unit 160 determines whether or not a value of the input data and/or the output data stored in the IO data memory 124 or a change in the value satisfies any one trigger condition 1622 defined in the logging configuration 162. When it is determined that the value or the change satisfies the trigger condition 1622, a data logging process of the target data according to the output configuration 1624 associated with the trigger condition 1622 determined to be satisfied is started. Logging data 166 collected through the data logging process is output as data.

Typically, the collected logging data 166 is written to the memory card 118. That is, the monitoring processing unit 160 may write a value of the data to the memory card 118 which is an example of a detachable recording medium.

Alternatively, the collected logging data 166 may be written to the storage 106 in the standard control unit 100 or may be transmitted to another device via the field network 4 or the high-level network 6. For example, the logging data 166 may be transmitted to the server device 500 connected to the control system 2 via the high-level network 6.

The logging configuration 162 and the memory mapping information 164 may be stored in the memory card 118 itself. In this case, it is possible to prepare for the data logging process only by mounting the memory card 118 in which such information is stored in advance, in the standard control unit 100. That is, the monitoring processing unit 160 may read the logging configuration 162 (the trigger condition 1622 and the output configuration 1624) from the memory card 118 which is an example of a detachable recording medium.

The monitoring processing unit 160 can recognize a variable meant by the data stored in the IO data memory 124 by referring to the memory mapping information 164 prepared in advance. The trigger condition 1622 to be defined in the logging configuration 162 can be defined using one or a plurality of variables, and the memory mapping information 164 is prepared as information indicating whether such a variable corresponds to data stored in any area of the IO data memory 124.

F. Memory Mapping Information 164

Next, the memory mapping information 164 illustrated in FIG. 7 will be described.

FIG. 8 is a schematic diagram illustrating an example of the memory mapping information 164 used for the data logging process that is executed in the control system 2 according to the embodiment. Referring to FIG. 8, a variable name column 1642 and an address column 1644 are typically associated with each other in the memory mapping information 164.

Names of one or a plurality of variables (variable names) that can be designated as the trigger condition 1622 or the output configuration 1624 of the logging configuration 162 are stored in the variable name column 1642, and an address of the IO data memory 124 at which each variable is arranged is stored in the address column 1644.

It should be noted that a data structure of the memory mapping information 164 is not limited to that illustrated in FIG. 8, and any data structure (for example, a structure further including a data type of each variable or a comment) may be adopted.

The monitoring processing unit 160 can specify an address at which a variable designated as the trigger condition 1622 and/or a variable designated as the output configuration 1624 is arranged, by referring to the memory mapping information 164. Thus, the logging configuration 162 (the trigger condition 1622 and the output configuration 1624) may be defined using variables available in the safety control unit 200. In this case, the standard control unit 100 refers to the memory mapping information 164 indicating a correspondence relationship between the variables to be used for a definition of the logging configuration 162 (the trigger condition 1622 and the output configuration 1624) and the data held in the IO data memory 124. Since the memory mapping information 164 is generated at the same time when the safety program 2062 is generated, inconsistency between the safety control unit 200 and the standard control unit 100 can be prevented.

G. Logging Configuration 162

Next, the logging configuration 162 illustrated in FIG. 7 will be described.

FIG. 9 is a schematic diagram illustrating an example of a user interface screen 700 for generating the logging configuration 162 for the data logging process that is executed in the control system 2 according to the embodiment. FIG. 9 illustrates an example of the user interface screen 700 for generating the logging configuration 162. The user interface screen 700 may be provided by the support device 300, for example. In this case, the support device 300 provides a configuration reception function of providing the user interface screen 700 for generating the logging configuration 162 (the trigger condition 1622 and the output configuration 1624). However, the disclosure is not limited to the support device 300, and the safety control unit 200 itself may provide the user interface screen 700.

The user interface screen 700 includes a generation button 702, an input pulldown 704, and an input field 706. The generation button 702 receives an instruction to output the logging configuration 162 as a file on the basis of information input to the user interface screen 700. The input pulldown 704 receives a data logging number that is assigned to the logging configuration 162 to be generated. The input field 706 receives a data logging ID to be assigned to the logging configuration 162 to be generated. The data logging number and the data logging ID can be arbitrarily set by the user.

The user interface screen 700 further includes a trigger condition setting portion 710, an input field 716, and a slider 718.

The trigger condition setting portion 710 receives a setting of the trigger condition performed by the user. Specifically, the trigger condition setting portion 710 includes a variable designation portion 712 and a state designation portion 714. The user inputs the name of the variable (the variable name) serving as the trigger condition 1622 for data logging to the variable designation portion 712 and inputs a designation as to whether the trigger condition 1622 has been satisfied in a certain state of the input variable to the state designation portion 714.

In the example illustrated in FIG. 9, a variable "SR1" is set as a target, and a change in a value thereof to "False" (falling from True to False) is set as the trigger condition 1622.

The input field 716 receives a sampling period (a part of the output configuration 1624) for performing data logging after the trigger condition 1622 has been satisfied. In the example illustrated in FIG. 9, "5 ms" is set as the sampling period.

The slider 718 receives a configuration (a part of the output configuration 1624) as to whether data is collected from a certain previous period with reference to a timing at which the trigger condition 1622 has been satisfied. In the example illustrated in FIG. 9, data between "10.000 s" immediately before the timing at which the trigger condition 1622 has been satisfied and "5.000 s" following the timing at which the trigger condition 1622 has been satisfied is set to be logged.

Normally, when any event occurs, confirming a state immediately before the occurrence of the event is often desired, and therefore, setting such a pre-trigger ratio is effective. In this case, the monitoring processing unit 160 outputs a time-series value over a predetermined period of time including a timing at which it is determined that the trigger condition 1622 has been satisfied.

The user interface screen 700 further includes a target data setting portion 720 for setting the output configuration 1624. The target data setting portion 720 includes a variable name column 722, a data type column 724, and a comment column 726.

In the variable name column 722, a variable name for specifying a variable to be set as target data is set or displayed. In the data type column 724, a data type of the corresponding variable (for example, a Boolean safety variable (SAFEBOOL) or Boolean variable (BOOL)) is set. It should be noted that the data type set in the data type column 724 may be automatically set by referring to a variable definition or the like set in advance.

In the comment column 726, comments assigned to the variables set as the target data are set or displayed. For the comment column 726, the user may set any comments, or preset comments may be displayed in the comment column 726 by referring to a variable definition or the like.

For example, the same variables may be set as target data of the data logging process by copying and pasting variables displayed as a list on the screen for creating the safety program to the target data setting portion 720.

The configurations input via the user interface screen 700 illustrated in FIG. 9 are stored in the logging configuration 162. Data logging can be set for each number set in the input pulldown 704 of the user interface screen 700. In the single standard control unit 100, a plurality of logging configurations 162 may be executed in parallel or only a specific logging configuration 162 selected by the user may be executed.

As described above, in the control system 2 according to the embodiment, since the standard control unit 100 executes the data logging process, only the variables accessible to the standard control unit 100 (that is, the input data and/or the output data used in the safety control unit 200) may be the trigger condition 1622 and the output configuration 1624. Therefore, at a stage of generating the logging configuration 162, a determination may be made as to whether or not the variables set on the user interface screen 700 are valid in the data logging process. When the set variables are not valid (that is, when corresponding data cannot be accessed from the standard control unit 100), an error may be output together with a message indicating that the variables are not valid.

That is, when data not held in the IO data memory 124 of the standard control unit 100 is designated as the logging configuration 162 (the trigger condition 1622 or the output configuration 1624), the support device 300 providing the user interface screen 700 or the like may output a message.

The user interface screen 700 further includes an import button 732 and an export button 734. When the import button 732 is pressed, a process of reading the created logging configuration 162 using any method is executed. When the export button 734 is pressed, a process of externally outputting information set on the user interface screen 700 in any format is executed.

By adopting a function of importing the logging configuration 162 related to the data logging process to the user interface screen 700, a configuration of a functional unit mounted on the control system 2 is changed, for example, even when variables used in the safety program are the same. Accordingly, it is possible to regenerate the logging configuration 162 even when data mapping on the IO data memory 124 of the standard control unit 100 has been changed.

It should be noted that the data logging process being executable may be incorporated in the logging configuration 162 as a monitoring condition. For example, the logging configuration 162 in which a flag indicating a status of the safety control unit 200 (that is, a flag indicating that the data logging process is executable) has been defined as a trigger condition 1622 for starting the data logging process may be automatically generated. When the standard control unit 100 normally operates by incorporating such a trigger condition 1622, but the data logging process cannot be appropriately executed due to a problem in the safety control unit 200, it is not necessary to execute the data logging process uselessly.

H. Process Provided by Support Device 300

Next, a process that is provided by the support device 300 according to the embodiment will be described.

Figure 10:
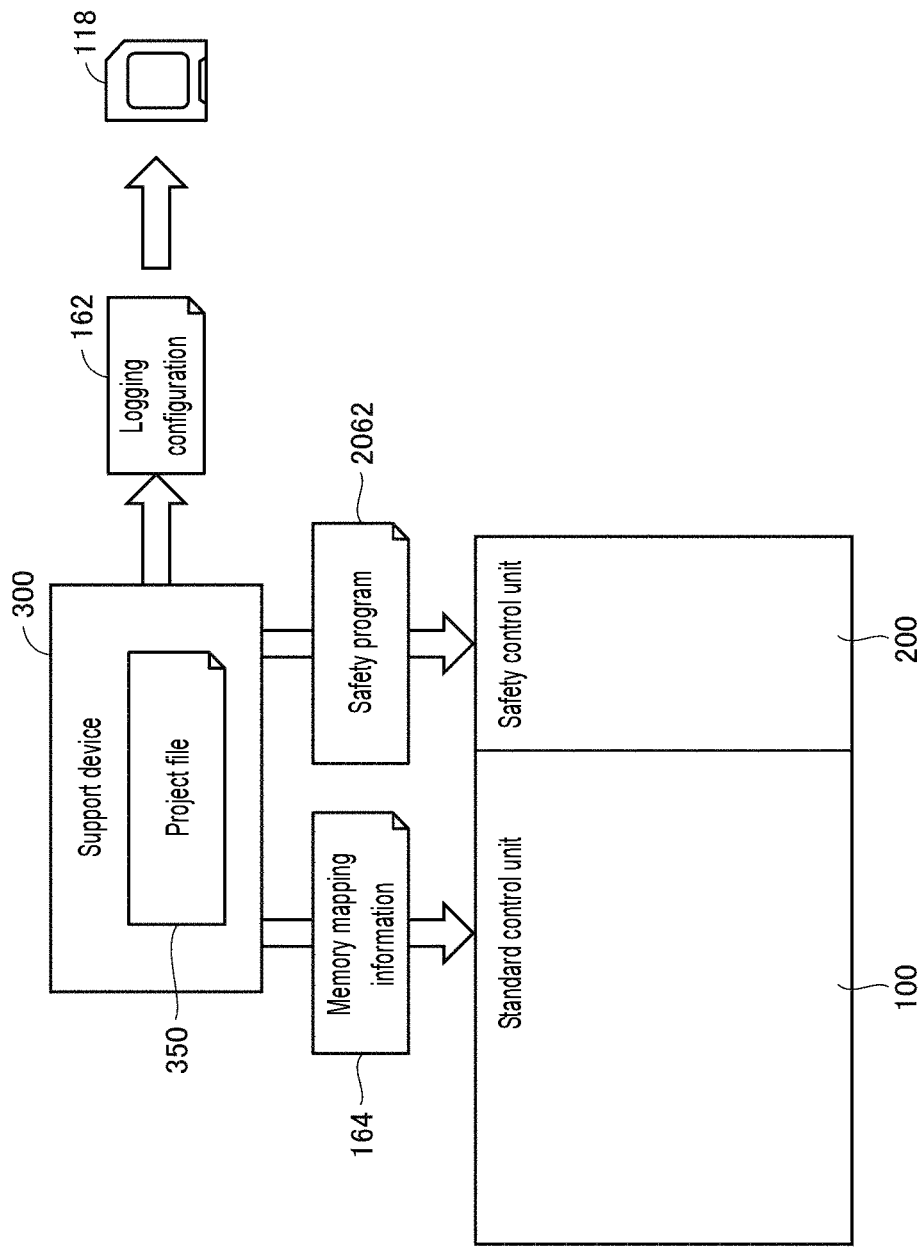
FIG. 10 is a schematic diagram illustrating a process that is provided by the support device according to the embodiment.

FIG. 10 is a schematic diagram illustrating a process that is provided by the support device 300 according to the embodiment. Referring to FIG. 10, it is assumed that a project file 350 for realizing safety control in the safety control unit 200 is stored in the support device 300. The support device 300 generates an object type safety program 2062 and generates the memory mapping information 164 by building (a type of compiling) the project file 350.

In the control system 2 according to the embodiment, the data stored in the IO data memory 124 of the standard control unit 100 becomes a target of the data logging process. Therefore, it is necessary to define a correspondence relationship between the variables available in the safety control unit 200 and the data in the IO data memory 124 accessible to the standard control unit 100. That is, it is necessary to define a path to the data in the IO data memory 124 that can be recognized by the standard control unit 100 that executes the data logging process from the variables of the safety control unit 200, and the memory mapping information 164 defines such a path to the data for each variable.

Further, when data logging is set via the user interface screen 700 as illustrated in FIG. 9, the logging configuration 162 is generated.

The safety program 2062 generated by the support device 300 is transferred (downloaded) to the safety control unit 200, and the memory mapping information 164 generated by the support device 300 is transferred (downloaded) to the standard control unit 100.

Further, the generated logging configuration 162 may be stored in the memory card 118 or the like. By storing the logging configuration 162 in the memory card 118, it is possible to give the logging configuration 162 to the standard control unit 100 via the memory card 118.

I. Example of Use

Next, an example of use of the data logging process that is provided by the control system 2 according to the embodiment will be described.

Figure 11:
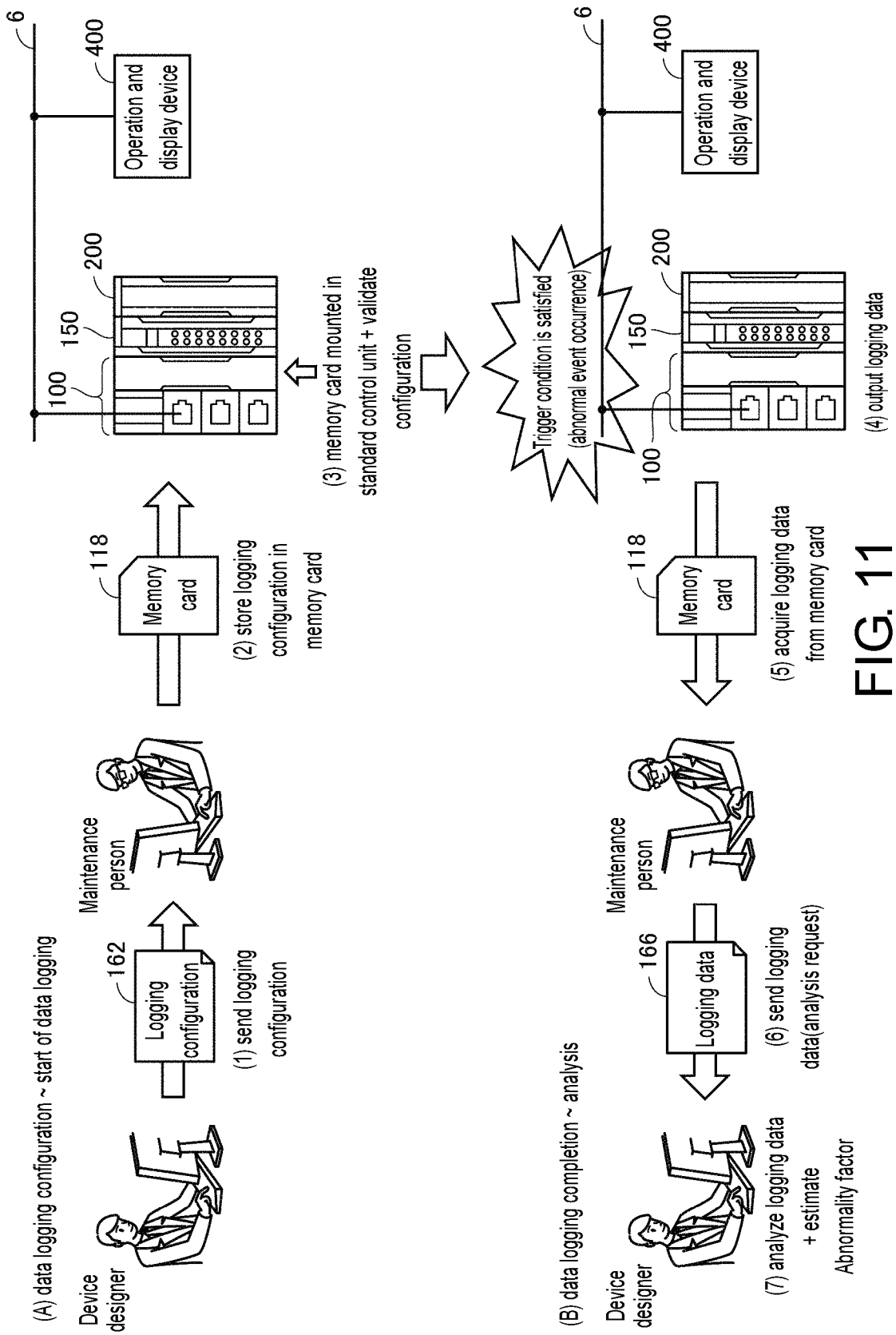
FIG. 11 is a schematic diagram illustrating an example of use of the data logging process that is provided by the control system according to the embodiment.

FIG. 11 is a schematic diagram illustrating an example of use of the data logging process that is provided by the control system 2 according to the embodiment. FIG. 11 illustrates an example of use in which a maintenance person in charge of maintenance at a manufacturing site and a device designer at a place different from the manufacturing site cooperate to estimate a cause of an abnormality.

Referring to FIG. 11, first, the device designer estimates one or a plurality of events that are analysis targets, generates a logging configuration according to each event, and sends the logging configuration to the maintenance person (process (1)). The maintenance person stores the logging configuration 162 received from the device designer in the memory card 118 (process (2)). Subsequently, the maintenance person mounts, in the standard control unit 100, the memory card 118 in which the logging configuration 162 has been stored, and validates the configuration (process (3)).

When any abnormality event occurs and the trigger condition 1622 has been satisfied in a state in which the setting has been validated, the standard control unit 100 outputs the logging data 166 (process (4)). Typically, the output logging data 166 is written to the memory card 118.

The maintenance person removes the memory card 118 to which the logging data 166 has been written from the standard control unit 100, acquires the logging data 166 from the removed memory card 118 (process (5)), and sends the logging data 166 to the device designer (process (6)). That is, the maintenance person requests the device designer to analyze the logging data 166.

The device designer analyzes the logging data 166 sent from the maintenance person and estimates the cause of the abnormality (process (7)). On the basis of on the content of the estimated cause of the abnormality, an advice regarding improvement of the device or the like is given from the device designer to the maintenance person.

By providing such a series of data logging process, even when an abnormality or the like of which a cause cannot be specified by the maintenance person occurs, it is possible to increase a likelihood of estimation or specifying of the cause of the abnormality through data analysis of the device designer having higher expertise.

Further, according to the control system 2 according to the embodiment, the maintenance person only needs to store the logging configuration 162 sent from the device designer in the memory card 118 and mount the memory card 118 in the standard control unit 100, the data logging process can be easily realized. By adopting such a "program-less" configuration, even when the maintenance person has poor expertise, the necessary logging data 166 can be reliably collected when any abnormality event has occurred, and as a result, it is possible to increase a likelihood of a cause of the abnormality event that has occurred being able to be specified.

J. Validation Operation

Next, an example of an operation for validating the configuration illustrated in FIG. 11 described above will be described.

As described above, after the memory card 118 in which the logging configuration 162 has been stored is mounted in the standard control unit 100, the user validates the logging configuration 162 to start monitoring as to whether or not the trigger condition 1622 of the data logging process has been satisfied. That is, the monitoring processing unit 160 may validate a determination as to whether or not the trigger condition 1622 has been satisfied in response to an operation of the user.

For such a validation operation, for example, (1) a method of pressing any service switch that is present in the standard control unit 100 or (2) a method of pressing any service switch that is present in the safety control unit 200 rather than the standard control unit 100 can be considered.

When the method of pressing any service switch that is present in the safety control unit 200 is adopted, an internal command for instructing validation of the logging configuration 162 is issued from the safety control unit 200 to the standard control unit 100. That is, in response to a user operation with respect to the safety control unit 200, the safety control unit 200 transmits to the standard control unit 100 a command for validating the determination as to whether or not the trigger condition 1622 has been satisfied.

Further, for the validation operation, (3) mounting, in the standard control unit 100, the memory card 118 in which the logging configuration 162 has been stored may be used as a start event, or (4) restarting the standard control unit 100 after the memory card 118 in which the logging configuration 162 has been stored is mounted in the standard control unit 100 may be used as a start event. When the method (3) is adopted, it takes least time and effort since it is only necessary for the memory card 118 in which the logging configuration 162 has been stored to be mounted in the standard control unit 100.

Further, for the validation operation, (5) operating an internal variable managed by the standard control unit 100 or the safety control unit 200 may be used as a start event. More specifically, for example, the user may validate the logging configuration 162 by changing a value of the internal variable such as a system variable via the operation and display device 400, the support device 300, or the like. By adopting the method of using the internal variable, it is possible to improve operability from an external device.

It should be noted that the state in which the logging configuration 162 is validated may be externally displayed or notified. As a method of such display or notification to the outside, arbitrary lamps and indicators arranged on the surface of the standard control unit 100 or the safety control unit 200 may be in a predetermined display form. For example, in the example of the configuration illustrated in FIG. 2, whether or not the data logging process is being monitored may be displayed using a 7-segment LED disposed on a surface of the safety control unit 200.

Further, a notification of a state in which the logging configuration 162 is validated by using internal variables (for example, system variables) managed by the standard control unit 100 or the safety control unit 200 may be sent to the outside. By using such internal variables, an object for notifying whether or not the data logging process is being monitored can be displayed on the user interface screen of the operation and display device 400.

It should be noted that the logging configuration 162 is not limited to the configuration given to the standard control unit 100 via the memory card 118, and methods such as data transfer from the support device 300 to the standard control unit 100 or downloading from the server device 500 to the standard control unit 100 can be used. Even in such a case, a validation setting method that is the same as that described above can be adopted.

K. Processing Procedure

Next, a processing procedure in the control system 2 according to the embodiment will be described.

Figure 12A:
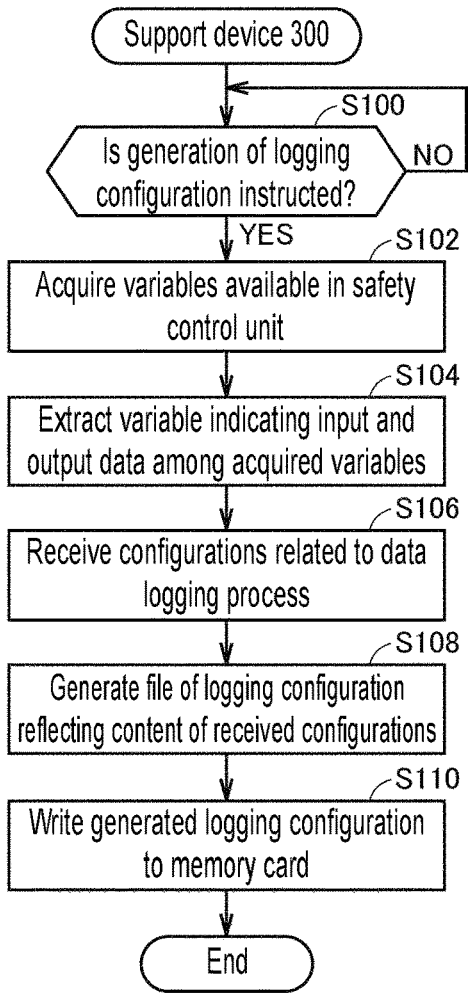
FIG. 12A illustrates an example of a processing procedure in the support device.
Figure 12B:
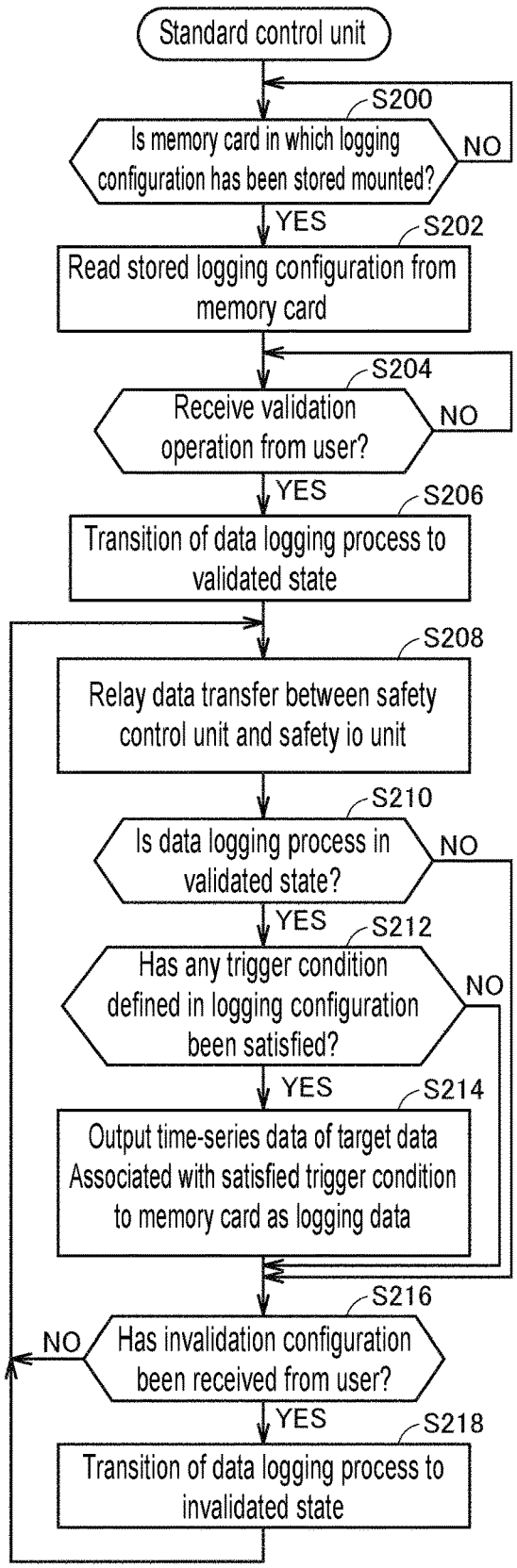
FIG. 12B illustrates an example of a processing procedure in the standard control unit.

FIG. 12A and FIG. 12B are flowcharts respectively showing an example of a processing procedure in the control system 2 according to the embodiment. FIG. 12A illustrates an example of a processing procedure in the support device 300, and FIG. 12B illustrates an example of a processing procedure in the standard control unit 100.

Referring to FIG. 12A, when generation of the logging configuration 162 is instructed (YES in step S100), the support device 300 acquires variables available in the safety control unit 200 (step S102) and extracts a variable indicating input and output data among the acquired variables (step S104). That is, the support device 300 extracts data for which the standard control unit 100 is involved in the data transfer among the variables available in the safety control unit 200. This extracted variable indicates data that is held in the IO data memory 124 of the standard control unit 100 and can be a candidate for target data of the data logging process.

Subsequently, the support device 300 receives configurations related to the data logging process including, for example, configurations of the trigger condition 1622 and the output configuration 1624 from the user (step S106). In response to the generation instruction from the user, the support device 300 generates a file of the logging configuration 162 reflecting the content of the received configurations (step S108). The support device 300 writes the generated file of the logging configuration 162 to the memory card 118 (step S110). The process then ends.

Referring to FIG. 12B, when the memory card 118 in which the logging configuration 162 has been stored is mounted or disposed (YES in step S200), the standard control unit 100 reads the stored logging configuration 162 from the memory card 118 (Step S202). When the standard control unit 100 receives a validation operation from the user (YES in step S204), the standard control unit 100 transitions to a state in which satisfaction of the trigger condition 1622 according to the read logging configuration 162 is periodically monitored (a validated state) by referring to the memory mapping information 164 held in advance (step S206).

The standard control unit 100 relays data transfer between the safety control unit 200 and the safety IO unit according to an instruction or a request from the safety control unit 200 (step S208).

Subsequently, the standard control unit 100 determines whether or not the data logging process is in a validated state (step S210). When the data logging process is not in the validated state (that is, when the data logging process is in an invalidated state) (NO in step S210), processes of steps S212 and S214 are skipped.

On the other hand, when the data logging process is in the validated state (YES in step S210), the standard control unit 100 determines whether any trigger condition 1622 defined in the logging configuration 162 has been satisfied by referring to data stored in the IO data memory 124 to be used for data transfer of input data and/or output data (step S212). When any trigger condition 1622 defined in the logging configuration 162 has been satisfied (YES in step S212), the standard control unit 100 outputs time-series data of target data designated as the output configuration 1624 associated with the satisfied trigger condition 1622 to the memory card 118 as logging data (step S214).

Subsequently, when any trigger condition 1622 defined in the logging configuration 162 is not satisfied (NO in step S212) or after step S214 is executed, the standard control unit 100 determines whether or not an invalidation setting has been received from the user (step S216). When the invalidation setting has not been received from the user (NO in step S216), the processes of step S208 and the subsequent steps are repeated.

When the invalidation setting has been received from the user (YES in step S216), the standard control unit 100 transitions to the invalidated state for the data logging process according to the read logging configuration 162 (step S218). The processes of step S208 and subsequent steps are repeated.

L. Modification Example

In the above description, the control system 2 in which the standard control unit 100 and the safety control unit 200 are combined has been mainly exemplified, but the disclosure is not limited thereto and it is obvious that the technical spirit of the disclosure can also be applied to a control system in which a plurality of standard control units 100 are combined and a control system in which a plurality of control units 200 are combined. Further, the disclosure is not limited to the standard control unit and the safety control unit, and any combination of control units is possible.

M. Appendix

The embodiment as described above includes the following technical spirits.

[Configuration 1]

A control system comprising:

a first control unit (100) that executes a first control program (1062), a second control unit (200) that executes a second control program (2062), and an input and output unit (10; 250) that serves to input a signal from a field and/or output a signal to the field, wherein the first control unit includes:

a data transfer relay unit (20; 120) that executes a process of transferring input data corresponding to a signal input to the input and output unit to the second control unit according to a request from the second control unit, and/or a process of transferring output data that defines a signal to be output from the input and output unit from the second control unit to the input and output unit, a storage unit (124) that holds the data transferred by the data transfer relay unit, and a monitoring processing unit (160) that determines whether or not a predetermined trigger condition (1622) has been satisfied on the basis of the data held in the storage unit, and outputs a value of any data held in the storage unit according to a predetermined output configuration (1624) when it is determined that the trigger condition has been satisfied. According to this disclosure, even when there is a control unit that cannot realize a data collection function due to various restrictions, data collection related to the control unit can be realized.

[Configuration 2]

The control system according to configuration 1, wherein the first control unit further includes an interface (116) that receives a detachable recording medium (118), and the monitoring processing unit writes the value of the data to the detachable recording medium.

According to this disclosure, since the value of the data to be output is written to a detachable recording medium, it is possible to facilitate secondary use such as analysis of a cause of an abnormality.

[Configuration 3]

The control system according to configuration 2, wherein the monitoring processing unit reads the trigger condition and the output configuration from the detachable recording medium.

According to this disclosure, when the trigger condition and the output configuration are stored in the detachable recording medium and then mounted in the first control unit, a process in the monitoring processing unit can be validated. Therefore, the data logging process can be simply used even when a maintenance person has poor expertise. That is, the data logging process can be realized in a "program-less" manner.

[Configuration 4]

The control system according to any one of configurations 1 to 3, wherein the monitoring processing unit validates a determination as to whether or not the trigger condition has been satisfied in response to a user operation.

According to this disclosure, since the data logging process can be validated only in necessary scenes, it is possible to avoid, for example, unnecessary monitoring and data output.

[Configuration 5]

The control system according to configuration 4, wherein the second control unit transmits a command for validating the determination as to whether or not the trigger condition has been satisfied to the first control unit in response to a user operation with respect to the second control unit.

According to this disclosure, since the data logging process for data that is handled by the second control unit can be validated by a user operating the second control unit, a target of the data logging process and an operation target are matched with each other. Accordingly, a likelihood of erroneous operation can be reduced.

[Configuration 6]

The control system according to any one of configurations 1 to 5, wherein the monitoring processing unit outputs a time-series value over a predetermined period including a timing at which it is determined that the trigger condition has been satisfied.

According to this disclosure, when any trigger condition has been satisfied, it is possible to recognize a temporal status change from immediately before the satisfaction, and therefore, a cause of an abnormality that has occurred or the like can be easily estimated.

[Configuration 7]

The control system according to any one of configurations 1 to 6, further comprising a configuration reception unit (300) that provides a user interface screen (700) for generating the trigger condition and the output configuration.

According to this disclosure, a setting operation of the trigger condition and the output configuration can be facilitated. In the above disclosure, the configuration reception unit may output a message when data not held in the storage unit of the first control unit is designated as the trigger condition or the output configuration.

[Configuration 8]

The control system according to configuration 7, wherein the configuration reception unit outputs a message when data not held in the storage unit of the first control unit is designated as the trigger condition or the output configuration.

[Configuration 9]

The control system according to any one of configurations 1 to 8, wherein the trigger condition and the output configuration are defined using variables available in the second control unit, the first control unit has memory mapping information (164) indicating a correspondence relationship between the variables used for definition of the trigger condition and the output configuration and the data held in the storage unit, and the memory mapping information is generated at the same time when the second control program is generated.

According to this disclosure, it is possible to maintain consistency between the memory mapping information referred to by the first control unit and the safety program executed by the second control unit.

[Configuration 10]

The control system according to any one of configurations 1 to 9, wherein the first control unit is a standard control unit that controls a control target according to a standard control program, the second control unit is a safety control unit that executes a safety program, and the input and output unit includes a safety input and output unit that serves to input a signal from a safety component and/or output a signal to the safety component.

According to this disclosure, the safety control unit executing the safety program is not involved in a process of outputting the value of the data when the trigger condition has been satisfied, and the standard control unit can output the value of the data alone. Therefore, the data logging process can be provided without having an influence on execution of the safety program in the safety control unit.

[Configuration 11]

A control device (100) that controls a control target according to a first control program (1062), the control device (100) being communicatively connected to a second control unit (200) executing a second control program (2062) and communicatively connected to an input and output unit (10; 250) that serves to input a signal from a field and/or output a signal to the field, the control device comprising:

a data transfer relay unit (20; 120) that executes a process of transferring input data corresponding to a signal input to the input and output unit to the second control unit according to a request from the second control unit, and/or a process of transferring output data that defines a signal to be output from the input and output unit from the second control unit to the input and output unit, a storage unit (124) that holds the data transferred by the data transfer relay unit, and a monitoring processing unit (160) that determines whether or not a predetermined trigger condition has been satisfied on the basis of the data held in the storage unit, and outputs a value of any data held in the storage unit according to a predetermined output configuration when it is determined that the trigger condition has been satisfied.

According to this disclosure, the control device executing the safety program is not involved in a process of outputting the value of the data when the trigger condition has been satisfied, and the standard control unit can output the value of the data alone. Therefore, the data logging process can be provided without having an influence on execution of the safety program in the safety control unit.

According to the disclosure, even when there is a control unit that cannot implement a data collection function due to various restrictions, data collection related to the control unit can be realized.

N. Advantages

In the control system according to the embodiment, the input data and the output data (IO data) used by the safety control unit 200 are exchanged with the safety IO units 10 and 250 via the standard control unit 100. By using such a configuration for data transfer, it is possible to realize monitoring according to the trigger condition and outputting the trace data at the time of satisfaction of the trigger condition in the standard control unit 100 without interfering with the execution of the safety program 2062 in the safety control unit 200. Accordingly, it is possible to facilitate investigation of a cause when any abnormality occurs while satisfying a need imposed on the safety control.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control system comprising:
a first control unit that executes a first control program;
a second control unit that executes a second control program; and
an input and output unit that serves to input a signal from a field and/or output a signal to the field,
wherein the first control unit includes:
a data transfer relay unit that executes a process of transferring input data corresponding to a signal input to the input and output unit to the second control unit according to a request from the second control unit, and/or a process of transferring output data that defines a signal to be output from the input and output unit from the second control unit to the input and output unit,
a storage unit that holds the data transferred by the data transfer relay unit, and
a monitoring processing unit that determines whether or not a predetermined trigger condition has been satisfied on the basis of the data held in the storage unit, and outputs a value of any data held in the storage unit according to a predetermined output configuration when it is determined that the trigger condition has been satisfied.

2. The control system according to claim 1,
wherein the first control unit further includes an interface that receives a detachable recording medium, and
the monitoring processing unit writes the value of the data to the detachable recording medium.

3. The control system according to claim 2, wherein the monitoring processing unit reads the trigger condition and the output configuration from the detachable recording medium.

4. The control system according to claim 2, wherein the monitoring processing unit outputs a time-series value over a predetermined period including a timing at which it is determined that the trigger condition has been satisfied.

5. The control system according to claim 2,
wherein the trigger condition and the output configuration are defined using variables available in the second control unit,
the first control unit has memory mapping information indicating a correspondence relationship between the variables used for definition of the trigger condition and the output configuration and the data held in the storage unit, and
the memory mapping information is generated at the same time when the second control program is generated.

6. The control system according to claim 2,
wherein the first control unit is a standard control unit that controls a control target according to a standard control program,
the second control unit is a safety control unit that executes a safety program, and
the input and output unit includes a safety input and output unit that serves to input a signal from a safety component and/or output a signal to the safety component.

7. The control system according to claim 1, wherein the monitoring processing unit validates a determination as to whether or not the trigger condition has been satisfied in response to a user operation.

8. The control system according to claim 7, wherein the second control unit transmits a command for validating the determination as to whether or not the trigger condition has been satisfied to the first control unit in response to a user operation with respect to the second control unit.

9. The control system according to claim 8, wherein the monitoring processing unit outputs a time-series value over a predetermined period including a timing at which it is determined that the trigger condition has been satisfied.

10. The control system according to claim 9,
wherein the trigger condition and the output configuration are defined using variables available in the second control unit,
the first control unit has memory mapping information indicating a correspondence relationship between the variables used for definition of the trigger condition and the output configuration and the data held in the storage unit, and
the memory mapping information is generated at the same time when the second control program is generated.

11. The control system according to claim 9,
wherein the first control unit is a standard control unit that controls a control target according to a standard control program,
the second control unit is a safety control unit that executes a safety program, and
the input and output unit includes a safety input and output unit that serves to input a signal from a safety component and/or output a signal to the safety component.

12. The control system according to claim 7,
wherein the trigger condition and the output configuration are defined using variables available in the second control unit,
the first control unit has memory mapping information indicating a correspondence relationship between the variables used for definition of the trigger condition and the output configuration and the data held in the storage unit, and
the memory mapping information is generated at the same time when the second control program is generated.

13. The control system according to claim 7,
wherein the first control unit is a standard control unit that controls a control target according to a standard control program,
the second control unit is a safety control unit that executes a safety program, and
the input and output unit includes a safety input and output unit that serves to input a signal from a safety component and/or output a signal to the safety component.

14. The control system according to claim 1, wherein the monitoring processing unit outputs a time-series value over a predetermined period including a timing at which it is determined that the trigger condition has been satisfied.

15. The control system according to claim 1, further comprising a configuration reception unit that provides a user interface screen for generating the trigger condition and the output configuration.

16. The control system according to claim 15, wherein the configuration reception unit outputs a message when data not held in the storage unit of the first control unit is designated as the trigger condition or the output configuration.

17. The control system according to claim 16,
wherein the trigger condition and the output configuration are defined using variables available in the second control unit,
the first control unit has memory mapping information indicating a correspondence relationship between the variables used for definition of the trigger condition and the output configuration and the data held in the storage unit, and the memory mapping information is generated at the same time when the second control program is generated.

18. The control system according to claim 1, wherein the trigger condition and the output configuration are defined using variables available in the second control unit, the first control unit has memory mapping information indicating a correspondence relationship between the variables used for definition of the trigger condition and the output configuration and the data held in the storage unit, and the memory mapping information is generated at the same time when the second control program is generated.

19. The control system according to claim 1, wherein the first control unit is a standard control unit that controls a control target according to a standard control program, the second control unit is a safety control unit that executes a safety program, and the input and output unit includes a safety input and output unit that serves to input a signal from a safety component and/or output a signal to the safety component.

20. A control device that controls a control target according to a first control program, the control device being communicatively connected to a second control unit executing a second control program and communicatively connected to an input and output unit that serves to input a signal from a field and/or output a signal to the field, the control device comprising:

a data transfer relay unit that executes a process of transferring input data corresponding to a signal input to the input and output unit to the second control unit according to a request from the second control unit, and/or a process of transferring output data that defines a signal to be output from the input and output unit from the second control unit to the input and output unit, a storage unit that holds the data transferred by the data transfer relay unit, and a monitoring processing unit that determines whether or not a predetermined trigger condition has been satisfied on the basis of the data held in the storage unit, and outputs a value of any data held in the storage unit according to a predetermined output configuration when it is determined that the trigger condition has been satisfied.

* * * * *